United States Patent
Tako et al.

(10) Patent No.: US 9,521,450 B2
(45) Date of Patent: Dec. 13, 2016

(54) CONTENT OUTPUT DEVICE AND PROGRAM

(71) Applicant: Renesas Electronics Corporation, Kawasaki-shi (JP)

(72) Inventors: Masami Tako, Tokyo (JP); Naohiro Nishikawa, Kawasaki (JP); Yuichi Takagi, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 14/617,780

(22) Filed: Feb. 9, 2015

(65) Prior Publication Data
US 2015/0243328 A1    Aug. 27, 2015

(30) Foreign Application Priority Data
Feb. 21, 2014    (JP) .................................. 2014-031487

(51) Int. Cl.
*H04N 21/43*    (2011.01)
*H04N 21/44*    (2011.01)

(52) U.S. Cl.
CPC .... *H04N 21/4307* (2013.01); *H04N 21/44004* (2013.01)

(58) Field of Classification Search
None
See application file for complete search history.

(56) References Cited

U.S. PATENT DOCUMENTS

2001/0026327 A1* 10/2001 Schreiber ......... H04N 21/23608
                                                             348/518
2011/0069223 A1*  3/2011 Nishikawa ............. H04N 5/602
                                                             348/425.4

FOREIGN PATENT DOCUMENTS

JP    2001-292381 A    10/2001
JP    2011-035775 A     2/2011

* cited by examiner

*Primary Examiner* — Eileen Adams
(74) *Attorney, Agent, or Firm* — McGinn IP Law Group, PLLC

(57) ABSTRACT

At the time of device starting or channel switching in a content output device, even when buffering of a sufficiently large size is performed in order to address multimedia processing at the time of start of a device and content switching, slow reproduction in which video and audio are synchronized with each other can be performed without keeping a user waiting for a long time, and at an arbitrary reproduction rate with the extent of not giving the user feeling of unnaturalness. The broadcasting reception unit initializes the delay amount to a predetermined start value, then gradually increases it with lapse of time, and stops the increase when the delay amount reaches a predetermined end value. Video and audio are synchronously and slowly reproduced at a reproduction rate decided by an increment per unit time of the delay amount.

17 Claims, 11 Drawing Sheets

CONTENT OUTPUT DEVICE AND PROGRAM

CROSS-REFERENCE TO RELATED APPLICATION

The disclosure of Japanese Patent Application No. 2014-031487 filed on Feb. 21, 2014 including the specification, drawings and abstract is incorporated herein by reference in its entirety.

BACKGROUND

Field of the Invention

The present invention relates to a content output device and a program, and in particular, can be suitably utilized for a content output device in which a plurality of programs including the program perform multimedia processing by operating on a processor.

Description of the Related Art

In multimedia processing, in order to increase a parallel degree of processing, various types of application programs are divided into a plurality of threads, respectively, and a series of threads that executes the same application is coupled to each other via a buffer. The buffer holds (also called "buffers" or "accumulates") data output from one thread until the data is used by other threads. A data amount held in the buffer increases and decreases according to a difference between a speed at which data is output from a previous thread and a speed at which a subsequent thread uses the data. When the threads originating from a plurality of applications are executed in parallel, the subsequent thread that uses data held in the buffer is often kept waiting due to processing of other threads in parallel, and an increase and decrease width of the data amount held in the buffer becomes large. In the multimedia processing, control using threads is performed as described above. In addition, in a system that has employed an OS (Operating System), such as Linux (a registered trademark, and the same hereinafter), multimedia processing may be performed in parallel without previously deciding priority of threads. There is a case of giving such system a function to receive and reproduce digital television broadcasting. For that purpose, since start of each thread may be delayed, and thus sound interruption and non-smoothness of video may possibly occur, it is necessary to enlarge a buffer between the threads. However, enlarging the buffer causes deterioration of responsiveness to user operation.

Japanese Patent Laid-Open No. 2011-35775 (Patent Literature 1) discloses a moving image output device that can output video and audio without feeling of unnaturalness in response to operation of requesting viewing of moving images. Before normal reproduction that is started after buffer amounts of video data and audio data reach predetermined values, respectively, video data is output using accumulating video data at a speed lower than a reproduction speed at the time of still image output or the normal reproduction, and the audio data is output at a reproduction speed not less than a predetermined value asynchronously with the reproduction of the video data.

Japanese Patent Laid-Open No. 2001-292381 (Patent Literature 2) discloses a technology to perform slow reproduction during the period of time until channel switching processing is stabilized at the time of channel change of digital television broadcasting.

As a result of the present inventor examining Patent Literature 1 and Patent Literature 2, it turned out that there were the following new problems.

According to a technology described in Patent Literature 1, a problem in which output start of video and audio is delayed is solved even when the buffer between the threads is enlarged. However, since video is output at the low speed, and audio is output at the speed not less than the predetermined speed asynchronously with the video, synchronization of the video and the audio cannot be obtained. When a system scale becomes large, and a buffering amount needs to be increased, there occurs a problem in which, at the time of output start in a case or the like of starting output of moving images in response to operation of requesting viewing of the moving images, a period when video and audio are asynchronously output is further extended, and a period of deteriorating user visibility becomes long.

Although Patent Literature 2 describes that an audio signal that does not synchronize with video is made to be mute (a silent state), or the audio signal is decoded at a low decoding processing speed similar to a video signal, it does not disclose a specific method for that. Furthermore, it is pointed out that Patent Literature 1 "has a problem in which when an audio signal is decoded at a low decoding processing speed similar to a video signal, output audio is drawled, and a content also becomes difficult to hear".

Although means for solving such problems is explained below, the other problems and the new feature will become clear from the description of the present specification and the accompanying drawings.

SUMMARY

According to one embodiment, means for solving the problems is as follows.

Namely, the present invention is a content output device provided with: a content input unit; a buffer; a reproduction control unit; a video output unit; and an audio output unit, and is constituted as follows.

The content input unit extracts from an input content video data, audio data, time stamps (PTSs: Presentation Time Stamps) attached to the video data and the audio data, and common time information (PCR: Program Clock Reference). The buffer temporarily accumulates the video data and the audio data that are output from the content input unit, respectively. The reproduction control unit initializes a delay amount to a predetermined start value when a new content is input to the buffer, then gradually increases the delay amount with lapse of time, and stops the increase of the delay amount when the delay amount reaches a predetermined end value. The video output unit and the audio output unit sequentially output video data and audio data, respectively in which times obtained by adding the delay amount to the attached time stamps coincide with or have passed the common time information, among the video data and the audio data of the content accumulated in the buffer.

The following explains briefly the effect acquired by the one embodiment.

Namely, even when buffering of a sufficiently large size is performed in order to address multimedia processing at the time of start of a device and content switching, slow reproduction in which video and audio are synchronized with each other can be performed without keeping a user waiting for a long time, and at an arbitrary reproduction rate with the extent of not giving the user feeling of unnaturalness.

DETAILED DESCRIPTION

1. Summaries of Embodiments

Figure 1:
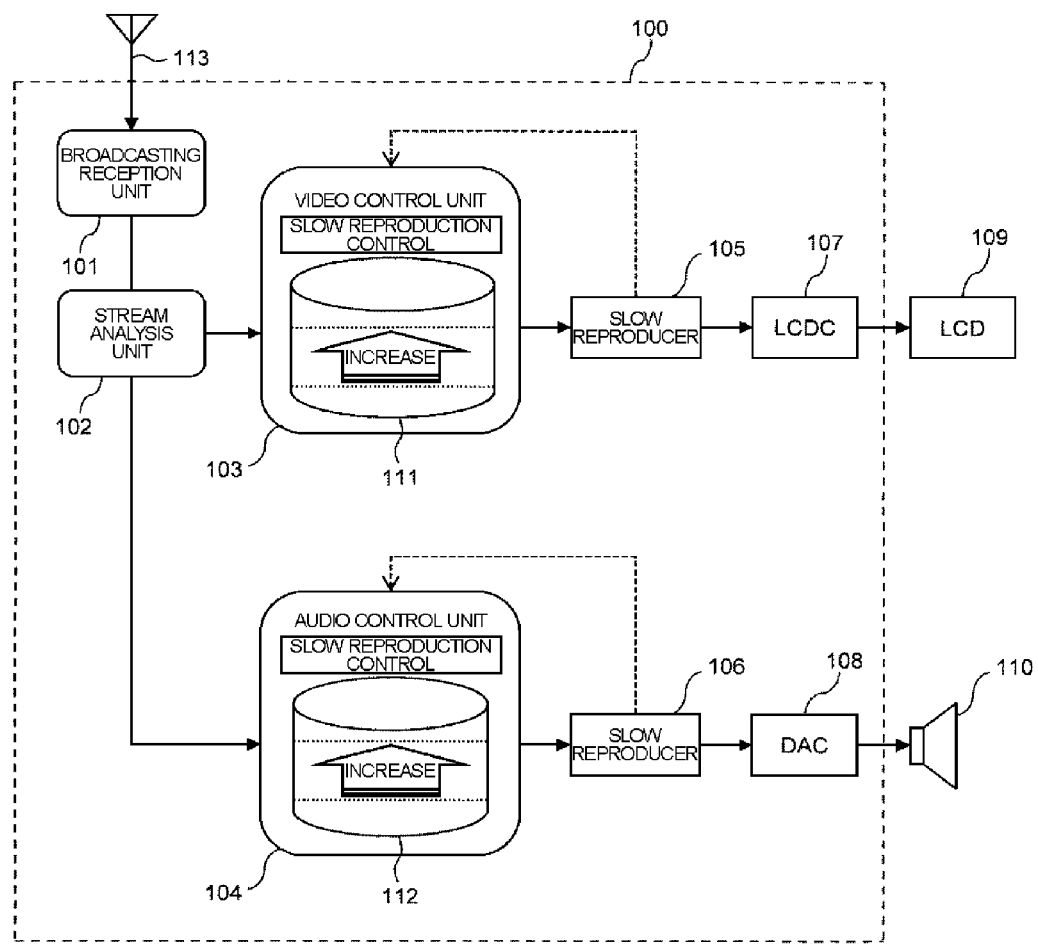
FIG. 1 is a block diagram showing a configuration example of a content output device according to a First Embodiment.

First, summaries of typical embodiments disclosed in the present application will be explained. A reference numeral in drawings to which parentheses are attached and that is referenced in explanation of the summaries of the typical embodiments only exemplifies what is included in a concept of a component to which the reference numeral is attached.

[1] <Content Output Device (Start Value and End Value of Delay Amount)>

A content output device according to typical embodiments disclosed in the present application is constituted as follows. The content output device extracts, from an input content, video data, audio data, time stamps (PTSs) attached to the video data and the audio data, and common time information (PCR), and manages local common time information (PCR_local) that changes with lapse of time based on the extracted common time information.

The content output device is provided with buffers (111 and 112) that temporarily accumulate the extracted video data and audio data based on a delay amount, respectively.

The content output device outputs video data in which a time obtained by adding the delay amount to the attached time stamp coincides with or has passed the local common time information, among the video data of the content accumulated in the buffer, and outputs audio data in which a time obtained by adding the delay amount to the attached time stamp coincides with or has passed the local common time information, among the audio data of the content accumulated in the buffer.

The content output device sets the delay amount to be a predetermined start value when a new content is input to the buffer, then gradually increases the delay amount with lapse of time, and stops the increase of the delay amount when the delay amount reaches a predetermined end value.

Consequently, even when buffering of a sufficiently large size is performed in order to address multimedia processing, at the time of start of a device and content switching, slow reproduction in which video and audio are synchronized with each other can be performed without keeping a user waiting for a long time, and at an arbitrary reproduction rate with the extent of not giving the user feeling of unnaturalness. Since a ratio at which the delay amount is increased can be arbitrarily set to be even an extremely small value, it becomes easy to adjust the delay amount to the extent of not giving the user feeling of unnaturalness. Note that the above-described term "coincidence" allows an error that is practically allowed in the present technical field, for example, the extent of an error to which the user cannot perceive non-coincidence.

[2] <Device Configuration>

In Item 1, the content output device is provided with: a broadcasting reception unit (101) that can receive a broadcast content; a stream analysis unit (102); a video control unit (103); a video reproduction unit (105); a display output unit (107); an audio control unit (104); an audio reproduction unit (106); and an audio output unit (108).

The buffer is constituted of a video buffer (111) that is included in the video control unit and accumulates video data, and an audio buffer (112) that is included in the audio control unit and accumulates audio data.

The broadcasting reception unit counts up, with lapse of time, common time information (PCR) periodically extracted from the input content, and manages the local common time information by intermittently calibrating it using the common time information.

The video control unit outputs, to the display output unit via the video reproduction unit, the video data in which the time obtained by adding the delay amount to the attached time stamp (PTS) coincides with or has passed the local common time information, among the video data of the content accumulated in the video buffer.

The audio control unit outputs, to the audio output unit via the audio reproduction unit, the audio data in which the time obtained by adding the delay amount to the attached time stamp (PTS) coincides with or has passed the local common time information, among the audio data of the content accumulated in the audio buffer.

The broadcasting reception unit sets the delay amount to the start value when a new content is input to the buffer, then gradually increases the delay amount with lapse of time, and stops the increase of the delay amount when the delay amount reaches the end value.

Consequently, the content output device of Item 1 can be easily constituted. Namely, the local common time information is calibrated every time the common time information (PCR) is periodically received. The video control unit and the audio control unit output data delayed by a common delay amount to each of the video reproduction unit and the audio reproduction unit. Since the delay amount in reading video data and audio data from the buffer is managed in common although the video control unit and the audio control unit independently operate, respectively, reproduction rates of slow reproduction of video and audio coincide with each other, and the video and the audio are reproduced and output in synchronization (lip sync) with each other.

[3] <Software>

In Item 2, the content output device is constituted including a processor (203) and a memory (211). The video control unit and the audio control unit are constituted of software that operates on the processor, and the video buffer and the audio buffer are allocated on the memory.

Consequently, the content output device of Item 2 can be constituted using the software.

[4] <Delay Amount Decision Unit>

In Item 3, the content output device has other software that uses the processor and the memory, and is further provided with a delay amount decision unit (401) that adjusts one or both of a first delay amount (the start value) and a second delay amount (the end value) based on a system load for executing the other software.

Consequently, one or both of a waiting time until reproduction output is started and a buffer size can be adjusted. When the first delay amount is decreased, the waiting time until the reproduction output is started can be decreased, and deterioration of user visibility can be suppressed. When the second delay amount is increased, the buffer size can be enlarged, and tolerance to thread delay can be enhanced.

[5] <LSI>

In Item 3 or 4, at least a part of hardware including the processor that constitutes the content output device is formed over a single semiconductor substrate.

Consequently, the content output device integrated in an LSI (Large Scale Integrated circuit) can be provided.

[6] <Content Output Program (Start Value and End Value of Delay Amount)>

A program according to the typical embodiments disclosed in the present application is the program for reproducing and outputting video and audio from a content input to an input circuit (202) by being executed by the processor (203), in a data processing device (200) constituted including the input circuit to which the content is input, the processor (203), and the memory (211); and the data processing device is constituted as follows.

The data processing device extracts, from the content input to the input circuit video data, audio data, time stamps (PTSs) attached to the video data and the audio data, and common time information (PCR), and manages local common time information (PCR_local) that changes with lapse of time based on the extracted common time information.

The data processing device is provided with the buffers (111 and 112) that are allocated on the memory and that temporarily accumulate the extracted video data and audio data, respectively.

The data processing device outputs the video data in which the time obtained by adding the delay amount to the attached time stamp coincides with or has passed the local common time information, among the video data of the content accumulated in the buffer, and outputs the audio data in which the time obtained by adding the delay amount to the attached time stamp coincides with or has passed the local common time information, among the audio data of the content accumulated in the buffer.

The data processing device sets the delay amount to be the predetermined start value when the new content is input to the buffer (S204), then gradually increases the delay amount with lapse of time (S206), and stops the increase of the delay amount when the delay amount reaches the predetermined end value (S205).

Consequently, in a data processing device that can perform multimedia processing even when buffering of a sufficiently large size is performed in order to address the multimedia processing at the time of start of a device and content switching, there can be provided the program that can perform slow reproduction in which video and audio are synchronized with each other without keeping the user waiting for a long time and at the arbitrary reproduction rate with the extent of not giving the user feeling of unnaturalness.

[7] <Configuration of Program>

In Item 6, the data processing device is further provided with a display output unit (207) and an audio output unit (208). The program includes: a local common time information management flow; a delay amount control flow; a video reproduction control flow; and an audio reproduction control flow.

The local common time information management flow counts up, with lapse of time, the common time information (PCR) periodically extracted from the input content, and manages the local common time information (PCR_local) by intermittently calibrating it using the common time information.

The video reproduction control flow outputs, to the display output unit, the video data in which the time obtained by adding the delay amount to the attached time stamp coincides with or has passed the local common time information, among the video data of the content accumulated in the buffer (S213 and S214). The audio reproduction control flow also outputs, to the audio output unit, the audio data in which the time obtained by adding the delay amount to the attached time stamp coincides with or has passed the local common time information, among the audio data of the content accumulated in the buffer (S213 and S214).

The delay amount control flow sets the delay amount to be the start value when the new content is input to the buffer (S204), then gradually increases the delay amount with lapse of time (S206), and stops the increase of the delay amount when the delay amount reaches the end value (S205).

Consequently, the program for making the data processing device operate similarly to the content output device of Item 2 can be provided.

[8] <Delay Amount Decision Unit>

In Item 6, the data processing device can execute other programs that use the processor and the memory, and the program is further provided with the delay amount decision unit (401) that adjusts one or both of the start value and the end value based on the system load for executing the other program.

Consequently, the program that exerts a working effect similar to Item 4 can be provided.

[9] <Thread>

In any one of Items 6 to 8, the program is divided into a plurality of threads and then executed.

Consequently, the program can be provided that exerts working effects of Items 6 to 8 also in the multimedia processing in which start of the thread may be kept waiting.

2. Detail of Embodiments

Embodiments will be further explained in detail.

First Embodiment

FIG. 1 is a block diagram showing a configuration example of a content output device 100 according to a First Embodiment.

The content output device 100 is constituted to be provided with: a broadcasting reception unit 101; a stream analysis unit 102; a video control unit 103; an audio control unit 104; slow reproducers 105 and 106 of respective video side and audio side; for example, a liquid crystal display controller (LCDC) 107 for outputting video; and, for example, a D/A converter (DAC) 108 for outputting audio.

In the broadcasting reception unit 101, a delay amount is provided as an adjustment method of a time of buffering performed before decoding. A start value and an end value are provided in the delay amount, and the delay amount is gradually increased with lapse of time. As to data acquired (received) by the broadcasting reception unit 101, video data is buffered by the video control unit 103, and audio data is buffered by the audio control unit 104, respectively, through the stream analysis unit 102. As will be described later, since a buffering time (an output delay time) is extended along with increase in the delay amount, the slow reproducers 105 and 106 are provided at output stages of the video control unit 103 and the audio control unit 104, respectively, and slow reproduction is performed at a conversion rate corresponding to the increased output delay time. In the video control unit 103 and the audio control unit 104, execution and stop of the slow reproduction are controlled based on feedback information from the slow reproducers 105 and 106.

A configuration and operation of the content output device 100 will be explained in more detail.

A content including video and audio, such as digital television broadcasting, is input to the broadcasting reception unit 101, and the broadcasting reception unit 101 supplies the input content to the stream analysis unit 102. For example, a tuner is incorporated in the broadcasting reception unit 101, and an antenna 113 is coupled thereto. The tuner may be externally attached, and content data of video and audio may be input. An input method of the content is not limited to broadcasting, may be streaming via a network, and the content may be input from a package medium, such as a Blu-ray (a registered trademark) disk and a DVD. The broadcasting reception unit 101 and the stream analysis unit 102 may be integrally constituted, they extract from an input content video data, audio data, time stamps (PTSs) attached to the video data and the audio data, and common time information (PCR), and manage local common time information (PCR_local) that changes with lapse of time based on the extracted common time information. The PCR is current time information presented from a broadcasting station, and is intermittently transmitted in conformity with a protocol of a broadcasting signal. The broadcasting reception unit 101 is provided with a free running counter, and manages the local common time information (PCR_local). The local common time information (PCR_local) is managed so as to change with lapse of time by a clock signal or the like of the content output device 100, and is calibrated using a value of the PCR every time the PCR from the broadcasting station is received. A management method of the local common time information (PCR_local) is not particularly limited to this method, and the current time information in common with the broadcasting station may just be managed in a constant error range. For example, although the PCR and the PTS are not included in a content input from the package medium, they may be generated in a reproduction device in a pseudo manner, and further, a mechanism that generates the PCR and the PTS in the pseudo manner may be incorporated in the broadcasting reception unit 101. The PTS is time information that indicates a time to output video data or audio data. The video data and the audio data having PTSs that coincide with the current time information, actually the local common time information (PCR_local) are output. Video and audio will be synchronously output on the basis of the current time information. The synchronization of the video and the audio is referred to as lip sync. The broadcasting reception unit 101 and the stream analysis unit 102 supply the extracted video data and the PTS attached thereto to the video control unit 103, and supply the extracted audio data and the PTS attached thereto to the audio control unit 104.

The video control unit 103 is provided with the video buffer 111 to buffer (accumulate) the supplied video data, performs slow reproduction control that reads the buffered data at a normal reproduction rate or a slow reproduction rate, and outputs it to the slow reproducer 105. A completion report of reproduction output is fed back for each frame from the slow reproducer 105. The output from the slow reproducer 105 is supplied to the liquid crystal display controller (LCDC) 107, and is displayed on an externally attached liquid crystal display device (LCD) 109. "Liquid crystal display" is one example of a target device to which the reproduced video is output, and the target device may be another display device.

Similarly to this, the audio control unit 104 is provided with the audio buffer 112 to buffer the supplied audio data, performs slow reproduction control that reads the buffered data at a normal reproduction rate or a slow reproduction rate, and outputs it to the slow reproducer 106. A completion report of reproduction output is fed back for each frame from the slow reproducer 106. The output from the slow reproducer 106 is supplied to the D/A converter (DAC) 108, and is output to an externally attached speaker 110. The "speaker" is one example of a target device to which the reproduced audio is output, and the target device may be another output device.

The broadcasting reception unit 101 manages the local common time information (PCR_local) that changes with lapse of time based on the common time information (PCR) extracted from the input content as described above. The broadcasting reception unit 101 further manages the delay amount for controlling reproduction output of video and audio. When the new content is input by channel switching etc., and extracted video data and audio data are buffered in the video buffer 111 and the audio buffer 112, respectively, the broadcasting reception unit 101 initializes the delay amount to the predetermined start value. After that, the broadcasting reception unit 101 gradually increases the delay amount with lapse of time, and stops the increase of the delay amount when the delay amount reaches a predetermined end value.

The video control unit 103 reproduces and outputs, by the slow reproducer 105, the video data in which the time obtained by adding the delay amount to the attached time stamp (PTS) coincides with or has passed the local common time information (PCR_local) among the video data buffered in the video buffer 111. The audio control unit 104 reproduces and outputs by the slow reproducer 106 the audio data in which the time obtained by adding the delay amount to the attached time stamp (PTS) coincides with or has passed the local common time information (PCR_local) among the audio data buffered in the audio buffer 112.

Figure 2A:
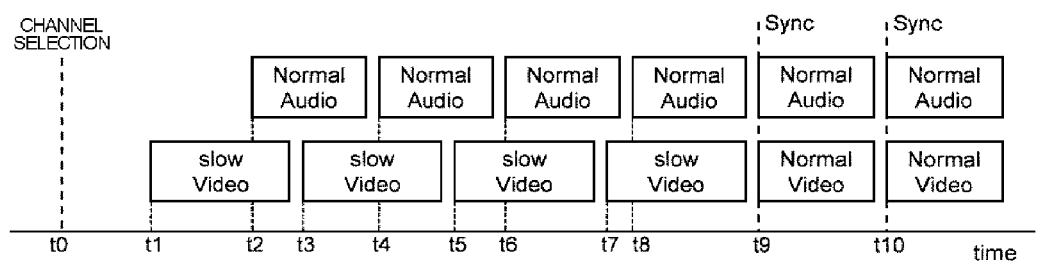
FIGS. 2A and 2B are explanatory diagrams showing operation examples of the content output device.
Figure 2B:
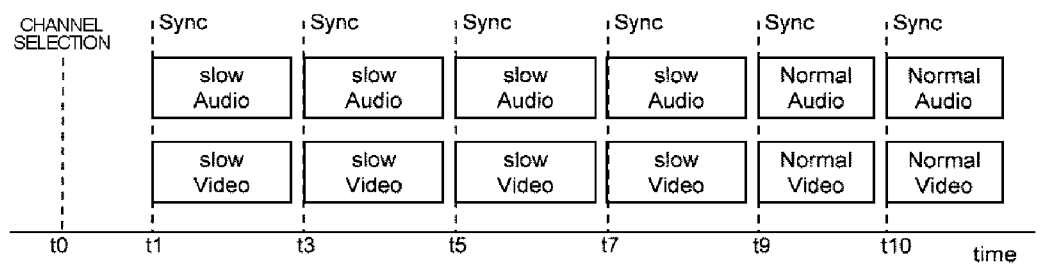

FIGS. 2A and 2B are explanatory diagrams showing operation examples of the content output device 100. FIG. 2A is the diagram schematically representing the operation example by a moving image output device described in Patent Literature 1 as a comparative example, and FIG. 2B is the diagram schematically representing the operation example of the content output device 100 according to the present embodiment, respectively. A horizontal axis indicates time, and audio and video that are reproduced and output are shown. Although frame sizes of the audio and the video actually differ, they are shown as the same length in order to facilitate understanding.

The operation example of the content output device 100 according to the present embodiment will be explained citing FIG. 2B. Head video data and audio data of an input content are not reproduced and output until local common time information (PCR_local) reaches a time obtained by adding a start value that is an initial value of a delay amount, to time stamps (PTSs) attached to the head data (frames). Input of a new content is assumed to be started by channel selection at the time t0, and neither audio nor video is output during the time period from the time t0 to the time t1. Since the delay amount is gradually increased with lapse of time during a period of times t1 to t9, the video control unit 103 and the audio control unit 104 perform the above-described control by using the delay amount, and thus video and audio are slowly reproduced. A reproduction rate at this time is prescribed by a rate at which the delay amount is increased. Since the video and the audio are reproduced and output based on common criteria which are the local common time information (PCR_local) and the delay amount, the video and the audio are slowly reproduced and output in synchronization with each other. When the delay amount reaches an end value, and the broadcasting reception unit 101 stops processing to increase the delay amount, the video control unit 103 and the audio control unit 104 perform the above-described control by using the delay amount after the stop (after the time t9 in FIG. 2B), and thus the video and the audio are reproduced at a normal rate. Synchronization of the video and the audio is kept also at this time.

Accumulation amounts of the video buffer 111 and the audio buffer 112 increase depending on an input data amount for a period from the time t0 at which the channel selection is performed to the time t1 at which reproduction is started. Since a reproduced and output data amount is less than an input data amount for a slow reproduction period of the times t1 to t9, the buffer accumulation amounts gradually increase. When reproduction at the normal rate is started after the time t9, the input data amount and the reproduced and output data amount become equal to each other, and the buffer accumulation amounts are kept constant. Even when buffering of a sufficiently large size is performed in order to address multimedia processing, at the time of start and content switching of the device, slow reproduction in which video and audio are synchronized with each other can be performed without keeping a user waiting for a long time, and at an arbitrary reproduction rate with the extent of not giving the user feeling of unnaturalness. This is because since slow reproduction in which the video and audio have been synchronized is started from a period having a small amount of buffers, and a reproduction rate of the slow reproduction can be prescribed by an increment to gradually increase the delay amount, the reproduction rate can be arbitrarily set to be a rate near the normal rate with the extent of not giving the user feeling of unnaturalness.

In the comparative example A, although the video is slowly reproduced and output for the period of the times t1 to t9 similarly to the present embodiment, the audio is reproduced at the normal rate during a period of the times t2 to t9. For this reason, the video and the audio are not synchronously reproduced and output for the period of the times t2 to t9. When buffering of the sufficiently large size is performed in order to address the multimedia processing, a silent period of the times t0 to t2 when the audio is not output becomes long, the period of the times t1 to t9 when the audio and the video are not synchronized also becomes long, and thus feeling of unnaturalness may be possibly given to the user.

A more specific implementation example according to hardware and software of the above-described content output device 100 will be explained below in detail. The following configuration example is merely one example, and the present invention is not limited to this.

Figure 3:
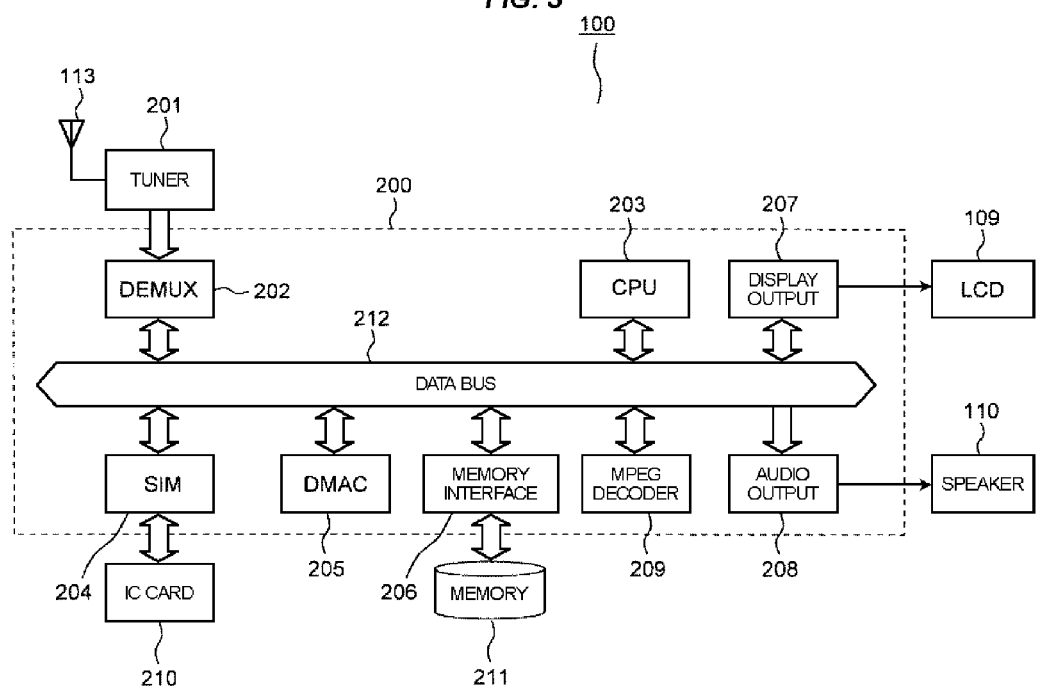
FIG. 3 is a block diagram showing a configuration example of hardware of the content output device.

FIG. 3 is a block diagram showing a configuration example of hardware of the content output device 100. The content output device 100 is constituted including the data processing device 200 that incorporates a processor, such as a CPU (Central Processing Unit). The data processing device 200 is, for example, an LSI, and a tuner 201, the antenna 113, an IC card 210, a memory 211, the LCD 109, and the speaker 110 are externally attached thereto. The data processing device 200 is constituted including: a CPU 203; a demultiplexer (DEMUX) 202; an IC card interface (SIM) 204; a direct memory access controller (DMAC) 205; a memory interface 206; an MPEG decoder 209; a display output module 207; and an audio output module 208. They are coupled to, for example, a common bus including a data bus 212, respectively, can be accessed from the CPU 203, and are controlled by the CPU 203.

Hardware of the above-described broadcasting reception unit 101 and the stream analysis unit 102 is constituted of the tuner 201 and the DEMUX 202, and the video buffer 111 and the audio buffer 112 are allocated to the memory 211. The DMAC 205 directly performs data transfer between memories or between memory-mapped memory space areas without via the CPU 203. The MPEG decoder is the decoder that conforms an input content to a standard of an MPEG (Motion Picture Element Group). Although the MPEG decoder can also be implemented by software, it is implemented by dedicated hardware since fixed-form processing to conform to the standard is performed. The display output module 207 is, for example, the LCD controller 107, and the audio output module 208 is, for example, the DAC 108. The CPU 203 reads and executes, for example, a program stored in the IC card 210, and thus performs the above-described operation. Operation of the broadcasting reception unit 101, the stream analysis unit 102, the video control unit 103, and the audio control unit 104 can be implemented by software processing by the CPU 203. The data processing device 200 may be provided with an externally attached or incorporated nonvolatile memory instead of the IC card 210. In addition, the data processing device 200 may be provided with an RAM (Random Access Memory) coupled to the incorporated bus 212 instead of the externally attached memory 211.

Digital television broadcasting is received by the antenna 113, channel selection thereof is performed by the tuner 201, and the digital television broadcasting is input to the DEMUX 202 as a broadcasting content. The CPU 203 performs software processing in addition to hardware processing of the tuner 201 and the DEMUX 202, and thus the content output device 100 extracts video data, audio data, time stamps (PTSs), respectively, attached thereto, and common time information (PCR), and manages local common time information (PCR_local) that changes with lapse of time based on the extracted PCR. The extracted video data and audio data are buffered in the buffers 111 and 112 of the video and the audio allocated to the memory 211 along with the attached PTSs. Video data to be reproduced is read from the memory 211, is decoded by the MPEG decoder 209, and is output and displayed onto the LCD 109 via the display output module 207. Audio data to be reproduced is read from the memory 211, predetermined decoding processing by the CPU 203 is performed, and the decoded audio data is output to the speaker 110 via the audio output module 208. The CPU 203 controls a delay value by executing delay control described later, also executes slow reproduction control described later, and thus performs slow reproduction based on the delay value or performs reproduction output of the video and the audio at a normal rate.

Figure 4:
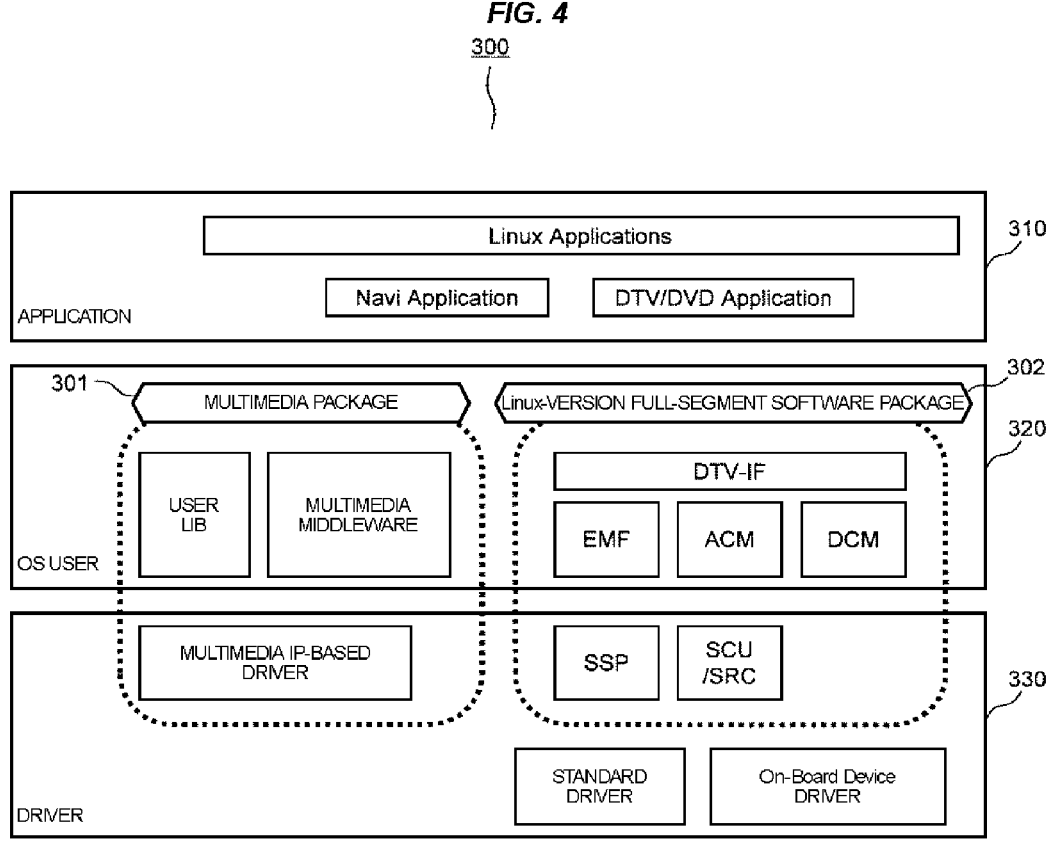
FIG. 4 is a hierarchical structure diagram showing a configuration example of software of the content output device.

FIG. 4 is a hierarchical structure diagram showing a configuration example of software 300 of the content output device 100. For example, the software 300 is constituted including three layers of an application layer 310, an OS/user layer 320, and a driver layer 330. A navigation (Navi Application), a DTV/DVD (DTV/DVD Application), and other Linux applications (Linux Applications) are included in the application layer 310. The OS/user layer 320 includes: multimedia middleware; a module (DVT-IF) that performs interface control for digital televisions; a module (EMF) that is located in a media framework layer and controls a media basic function group; a module (DCM) that has a display control management function; a module (ACM) that has an audio control management function; and the like in addition to a user library (user LIB). The driver layer 330 includes: a multimedia IP (Intellectual Property) based driver; an SSP (Stream and Security Processor); an SRC (Sampling Rate Conversion) driver (SCU/SRC) included in an SCU (Sampling rate Converter Unit); and the like in addition to a standard driver. Furthermore, the driver layer 330 may be constituted including an on-board device driver (On-Board Device Driver) used at the time of debugging. The multimedia middleware, the user library (user Lib), and the multimedia IP based driver are provided as, for example, a multimedia package; and the DTV-IF, the EMF, the ACM, the DCM, the SSP, and the SCU/SRC are provided as, for example, a Linux-version full-segment software package. The broadcasting reception unit 101 and the stream analysis unit 102 are implemented as a part of functions of the DTV-IF and the EMF; the video control unit 103 and the slow reproducer 105 are implemented as a part of functions of the EMF and the DCM; and the audio control unit 104 and the slow reproducer 106 are implemented as a part of functions of the EMF and the ACM, respectively, and they can be provided as a Linux-version full-segment software package 302 or options that are incorporated thereinto.

As described above, since a plurality of software packages 301, 302, and the like that have different intended use and functions and also have different sources are incorporated and executed in the data processing device 200, a plurality of threads derived from a plurality of programs operate in parallel. For this reason, even a thread that executes processing requiring a real time property, such as video and audio may have a long waiting time for start. When such a situation is assumed, enlargement of sizes of buffers, such as the video buffer 111 and the audio buffer 112 increases an accumulation amount of buffered data, and thus tolerance to the waiting time of the thread can be enhanced. In contrast, if reproduction output of audio and video is waited until an amount of buffering in the buffer reaches a large accumulation amount prescribed in consideration of the waiting time for start of the thread when input of a new content is started by channel selection or the like, a silent period and a non-display period become long, which gives the user feeling of unnaturalness. Consequently, such a problem is solved by constituting the content output device 100 as the above-described embodiment.

Figure 5:
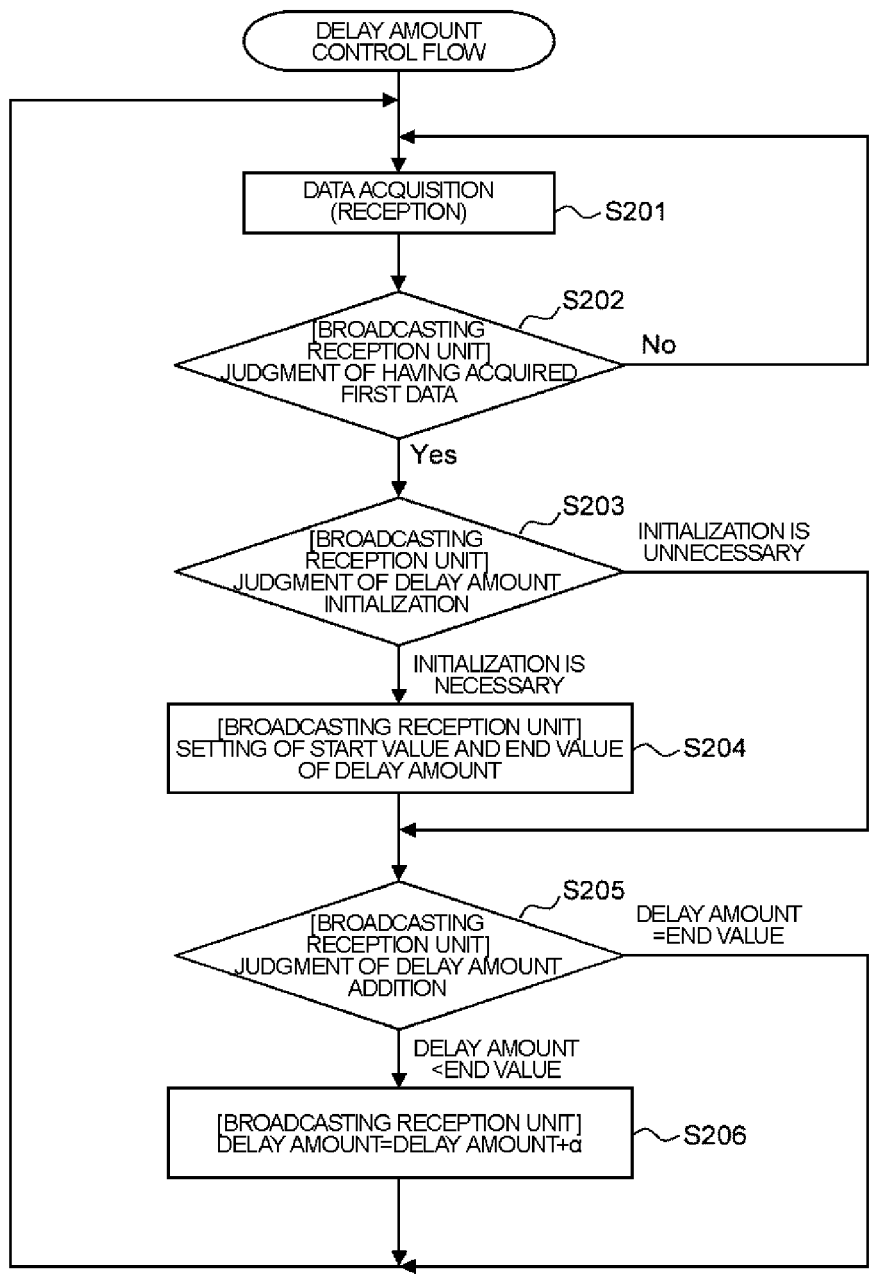
FIG. 5 is a flowchart showing a configuration example of a delay control flow of the content output device according to the First Embodiment.

FIG. 5 is a flowchart showing a configuration example of a delay control flow of the content output device 100 according to the First Embodiment.

When acquiring (receiving) data (S201), the broadcasting reception unit 101 judges whether to have acquired first data (S202). Here, the first data refers to data of a head frame when the content output device 100 is started, or a content of a channel different from a channel having been received until then by channel selection is received and is newly input. First data acquisition at the time of start, channel selection, or the like is judged as follows.

Figure 6:
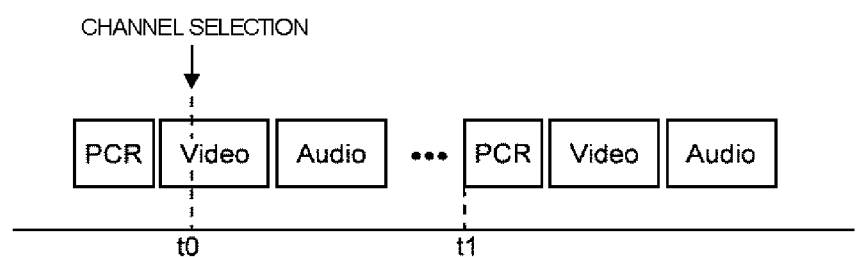
FIG. 6 is an explanatory diagram showing a configuration of packets constituting a content.

FIG. 6 is an explanatory diagram showing a configuration of packets that constitutes a content. The PCR that serves as common time information, video data (Video), and audio data (Audio) are sequentially transmitted (broadcast). User operation at the time of start, i.e., at the time of output start request, or at the time of channel selection is performed at a time t0, and subsequently, the PCR that serves as the common time information is acquired (received) at a time t1, which means that first data has been acquired. Namely, video data and audio data that follow the PCR acquired (received) first after the channel selection (time t0) is defined as the first data.

A data acquisition (reception) step (S201) is repeated until the first data has been acquired. Initialization judgment of a delay amount is performed after the first data has been acquired (S203). When the delay amount is not initialized, predetermined start value and end value are set to the delay amount (S204). The delay amount is initialized to the start value first, and setting of the delay amount is not performed after that. Next, judgment of delay amount addition is performed (S205). If the delay amount is less than the end value, an increment α is added to the delay amount (S206). When addition to the delay amount has already been performed until the delay amount reaches the end value, the increment α is not added to the delay amount. Note that the increment α is a counter value corresponding to a time, such as 100 μs, and that a correction ratio such as 0.1% with respect to a reproduction rate of normal reproduction with the extent of not giving the user feeling of unnaturalness is set to the increment α. Next, the processing returns to the data acquisition (reception) step (S201).

Figure 7:
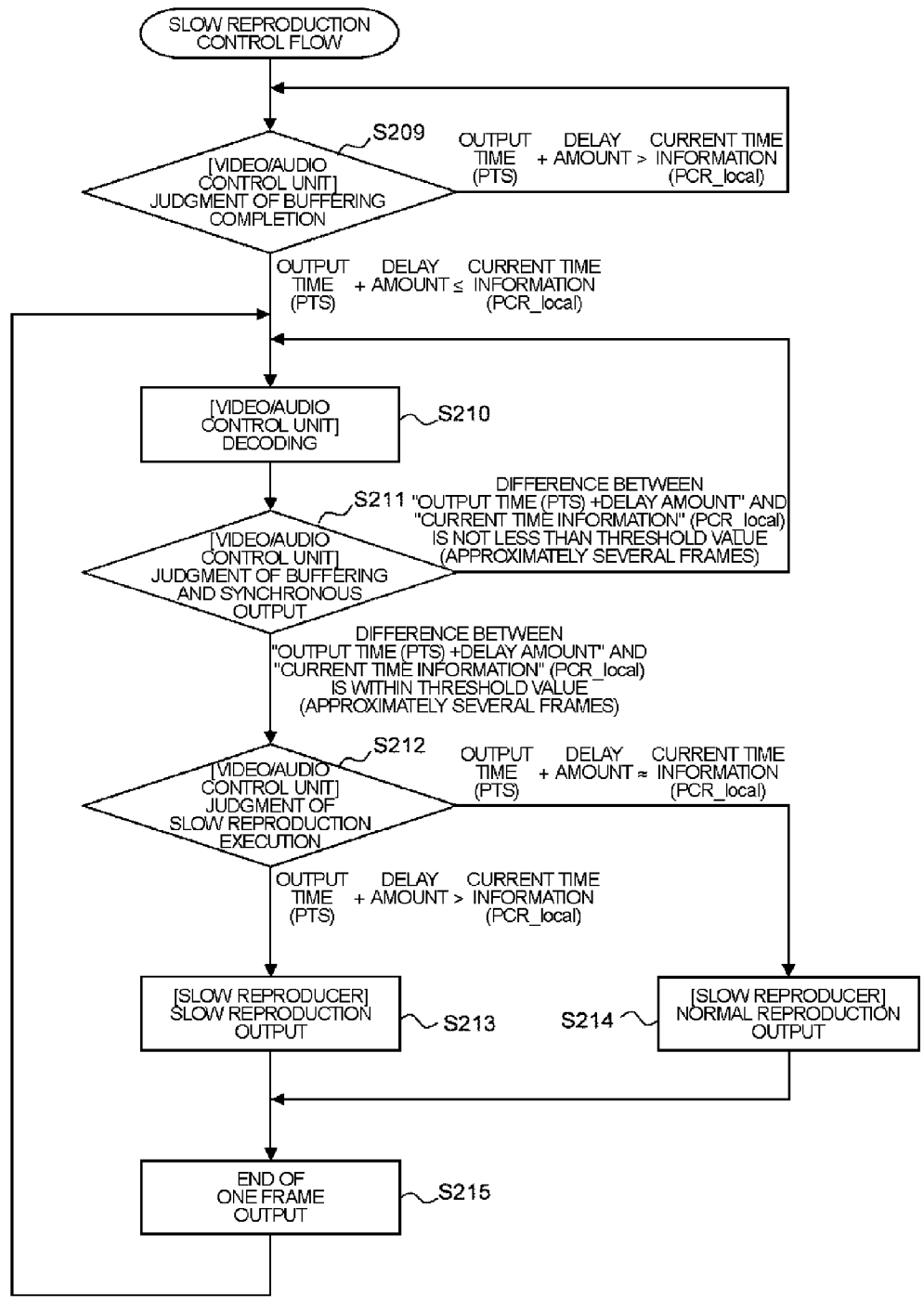
FIG. 7 is a flowchart showing a configuration example of a slow reproduction control flow of the content output device.

FIG. 7 is a flowchart showing a configuration example of a slow reproduction control flow of the content output device 100.

The video control unit 103 and the audio control unit 104 perform judgment of buffering completion (S209), respectively. When a value obtained by adding the delay amount controlled by the above-described delay amount control flow to an output time of the first data, i.e., a time stamp (PTS) attached to the first data becomes smaller than current time information, i.e., local common time information (PCR_local) managed by the broadcasting reception unit 101, buffering is completed. However, even after the buffering is completed, buffering of video data and audio data of an input content is continued as it is. When the buffering is completed, the video control unit 103 and the audio control unit 104 perform decoding by one frame, respectively (S210). After synchronous output judgment is performed (S211), judgment of slow reproduction execution (S212) is performed. In the synchronous output judgment (S211), when a difference between the output time (PTS)+the delay amount and the current time information (PCR_local) exceeds a previously prescribed threshold value (for example, several frames), a decoding step (S210) is repeated, and when the difference is less than the threshold value, the processing proceeds to judgment of slow reproduction execution (S212). When a value of the current time information (PCR_local) is smaller than the value obtained by adding the delay amount to the output time (PTS) of the acquired (received) data, slow reproduction output is performed (S213), and when the values are almost equal to each other, normal output is performed (S214). Since a sum of the output time (PTS) and the delay amount is larger than the current time information (PCR_local) by the addition amount during a period when addition to the delay amount is gradually performed by the above-described delay amount control flow (S206), the processing branches to a slow reproduction output side (S213) in the judgment of slow reproduction execution (S212). After that, when the delay amount reaches the end value by the delay amount control flow, and addition to the delay amount is not performed, the sum of the output time (PTS) and the delay amount becomes almost equal to the current time information (PCR_local), and thus the processing branches to a normal reproduction output side (S214) in the judgment of slow reproduction execution (S212). When the slow reproduction output or the normal output of one frame is completed, the slow reproducers 105 and 106 feed back end of the one frame output to, respectively, the video control unit 103 and the audio control unit 104 (S215), and the processing returns to decoding (S210) of a next frame. Here, the output time is updated to a time stamp (PTS) attached to a frame decoded next.

Although, in the above explanation, the slow reproduction control flow for video and the slow reproduction control flow for audio have been explained in combination with each other, these flows independently operate in parallel. It is more suitable that the video and the audio are constituted so as to independently operate since frame sizes thereof are not necessarily the same. Although the video and the audio independently operate, an output time of each frame is prescribed by the common current time information (PCR_local) and the common delay value, and thus the reproduced video and audio are synchronized (lip-synced) with each other.

Figure 8A:
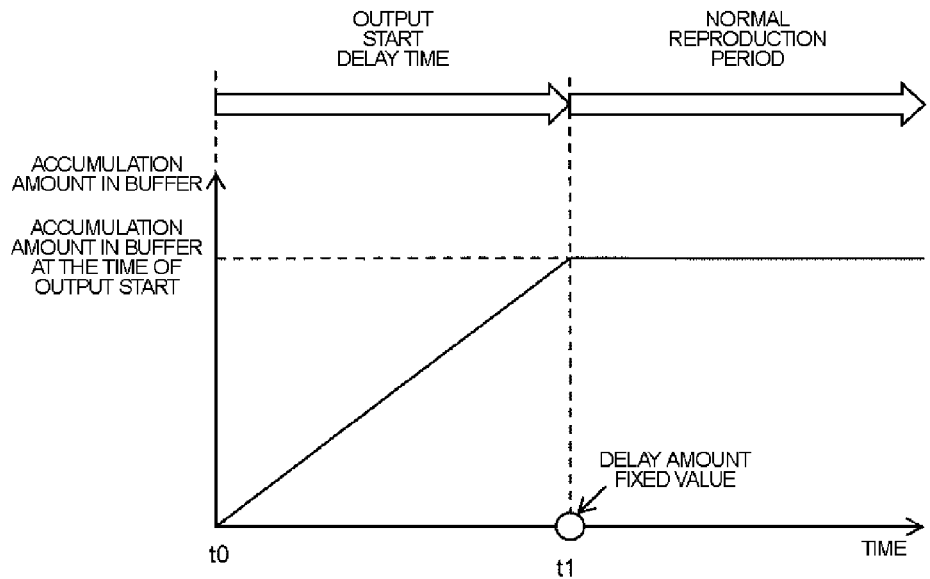
FIGS. 8A and 8B are graphs showing change of a buffer accumulation amount in operation of the content output device.
Figure 8B:
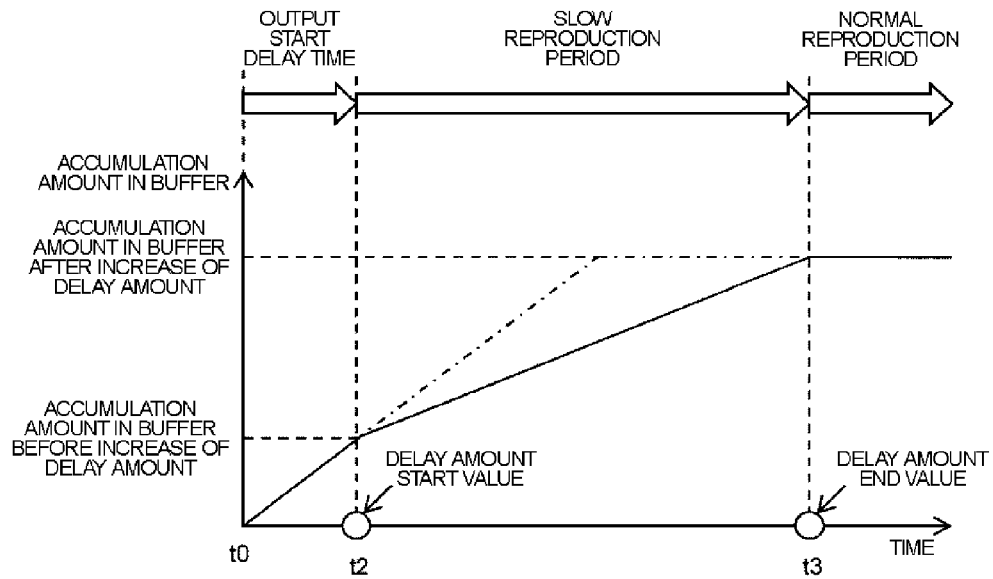

FIGS. 8A and 8B are graphs showing change of a buffer accumulation amount in operation of the content output device 100. FIG. 8A is the graph showing as a comparative example the change of the buffer accumulation amount in the content output device 100 in which a delay amount is fixed, and FIG. 8B is the graph showing the change of the buffer accumulation amount in the operation of the content output device 100 of the present embodiment in which the delay amount is controlled by the above-described delay amount control flow.

In the comparative example of FIG. 8A, the delay amount is fixed to a value corresponding to a period of t0 to t1. After the period from the time t0 when channel selection or the like is performed to the time t1 when a buffer amount corresponding to the delay amount which is a fixed value, is accumulated, reproduction by the normal rate is started. For this reason, an output start delay time becomes longer in proportion to the delay amount.

In contrast with this, in the present embodiment of FIG. 8B, a start value corresponding to a time t2 earlier than the time t1 is provided as a delay amount, a buffer amount accumulated at the time of output start is reduced, and an output start delay time can be shortened. After that, slow reproduction is performed for a period (times t2 to t3) until the buffer accumulation amount becomes a predetermined one. After the output is started, an input amount of the buffer is more increased as compared with an output amount by using a combination of increase in the delay amount and slow reproduction, and thus the buffer accumulation amount is increased. When the gradually increased delay amount reaches an end value (time t3), the slow reproduction is stopped, processing transitions to normal reproduction, and thus the input amount and the output amount of the buffer become steady, and the buffer accumulation amount is kept to be a constant amount to some extent.

Figure 9:
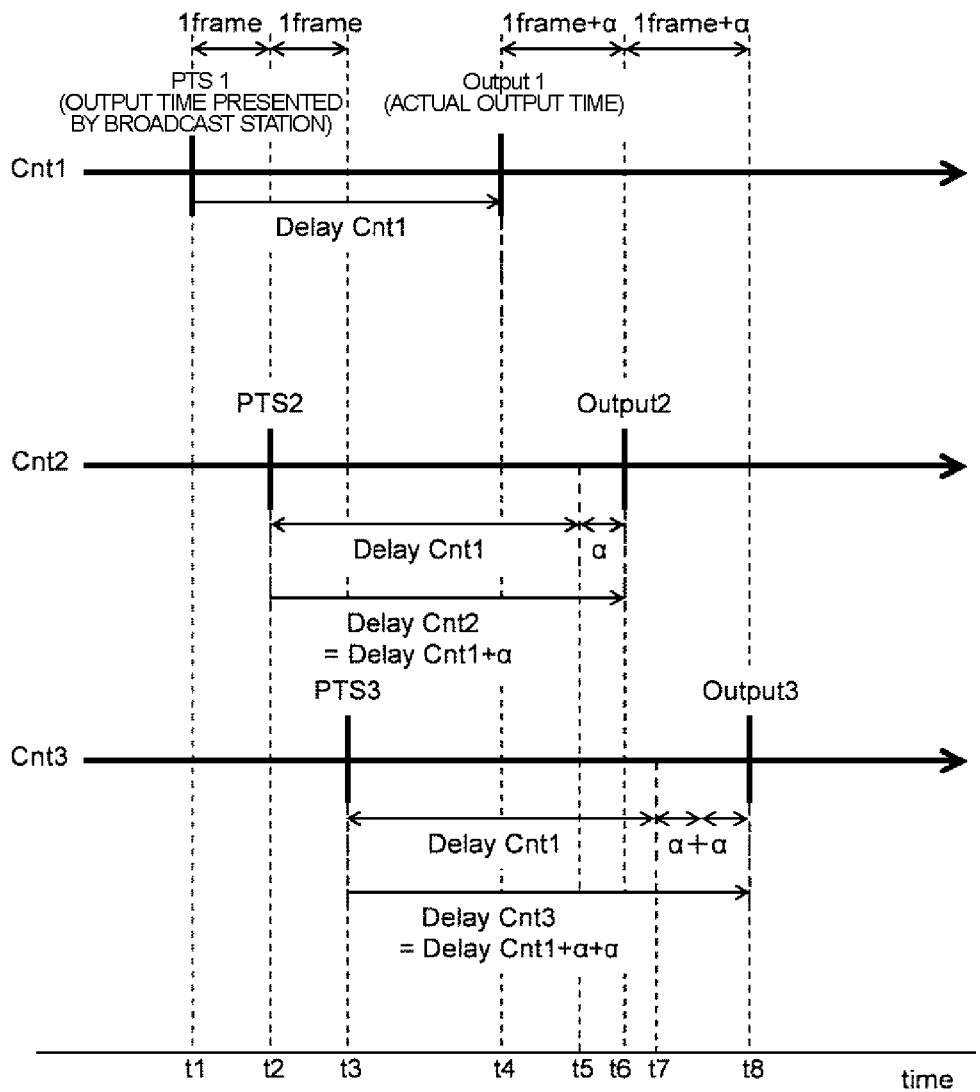
FIG. 9 is an explanatory chart showing an operation example of the slow reproduction control flow of the content output device.

FIG. 9 is an explanatory chart showing an operation example of the slow reproduction control flow of the content output device 100. A delay amount for each frame is shown as a Cnt1, a Cnt2, and a Cnt3 in output order, with a horizontal axis being set to be an elapsed time. The delay amount is set to be a Delay Cnt1 in a frame output at the time of the Cnt1, and actual output (Output1) is performed at a time t4 when the delay amount Delay Cnt1 is exceeded from an output time (PTS1) (a time t1) presented by a broadcasting station. A difference between the PTS1 (time t1) and a PTS2 (time t2) that are presented from the broadcasting station is the difference of one frame. In contrast, a difference between the Output1 (time t4) and an Output2 (a time t7) that are actually output is the difference of one frame+α. This shows that the frame output at the Output1 is slowly reproduced by a length of one frame+α by increasing the delay amount by α. Similarly, at the time (time t3) of the Cnt3, a difference between the PTS2 (time t2) and a PTS3 (time t3) is the difference of one frame, a difference between the Output2 (a time t6) and an Output3 (a time t8) is the difference of one frame+α, and slow reproduction output is performed at the same correction ratio.

As described above, the correction ratio that prescribes a reproduction rate of slow reproduction is prescribed by a value of the delay amount regardless of a length of the frame. Therefore, even if slow reproduction control of video and audio that have mutually different frame sizes is independently performed, respectively, they can be reproduced at the same reproduction rate. In addition, criteria of output times of the video and the audio are set to be current time information (PCR_local) in common, and thus the video and the audio can be synchronized (lip-synced) with each other.

As explained above, in the present embodiment, the start value of the delay amount that is increased with lapse of time is reduced, and slow reproduction is performed until the delay amount reaches the end value, whereby an output start time can be speeded up while synchronizing video and audio at the time of start of the program and channel switching.

Second Embodiment

Figure 10:
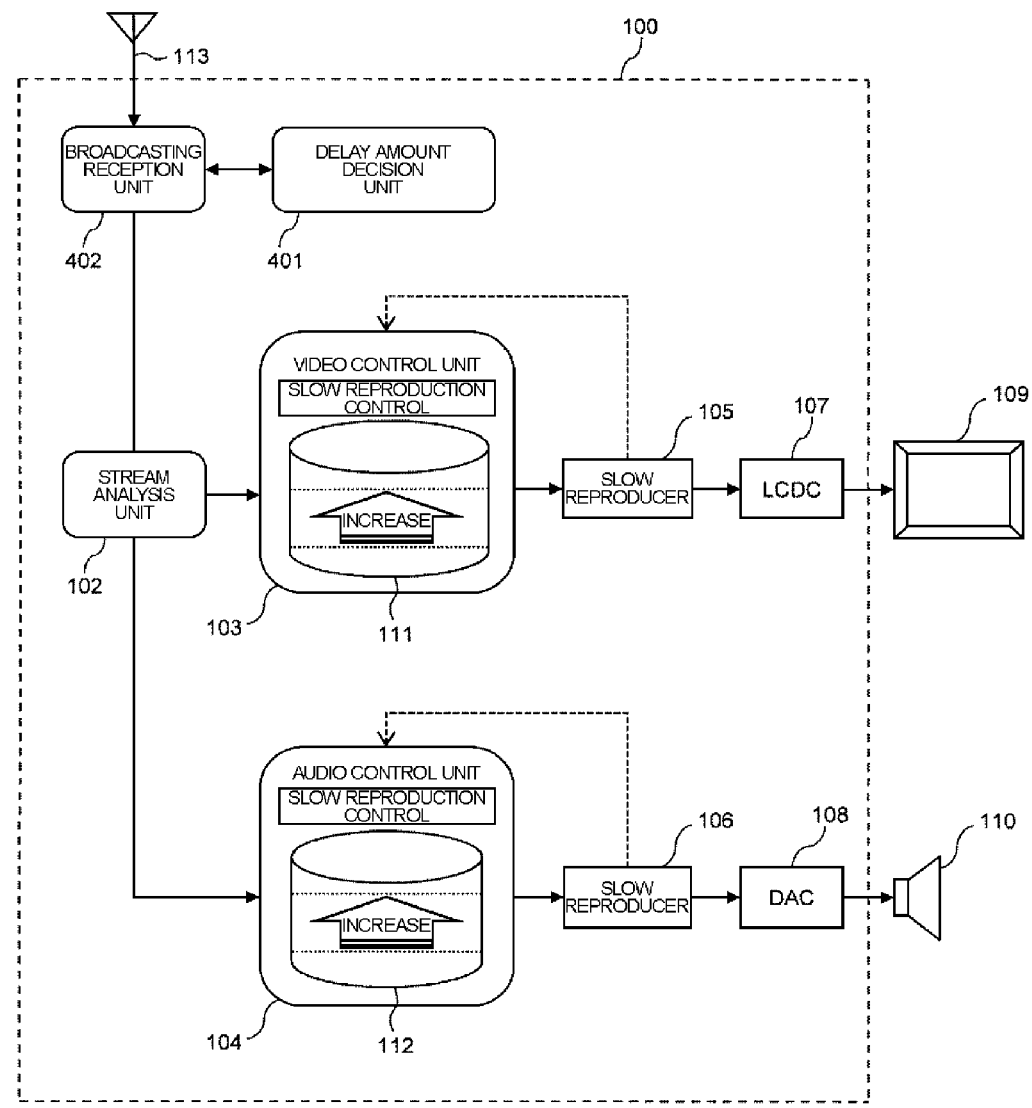
FIG. 10 is a block diagram showing a configuration example of a content output device according to a Second Embodiment.

FIG. 10 is a block diagram showing a configuration example of a content output device 100 according to a Second Embodiment. The content output device 100 of the Second Embodiment is further provided with a delay amount decision unit 401 with respect to the content output device 100 according to the First Embodiment shown in FIG. 1. The delay amount decision unit 401 is coupled to a broadcasting reception unit 402. The delay amount decision unit 401 calculates a start value and an end value of a delay amount according to a state of a system load, or the like. For example, when the system load is high, a large value is set to be the end value, and a buffering amount is increased. The broadcasting reception unit 402 inquires the start value and the end value of the delay amount decision unit 401 at the time of initialization of the delay amount, and decides the start value and the end value of the delay amount. Since configurations other than this are similar to the content output device according to the First Embodiment shown in FIG. 1, explanations thereof are omitted.

Figure 11:
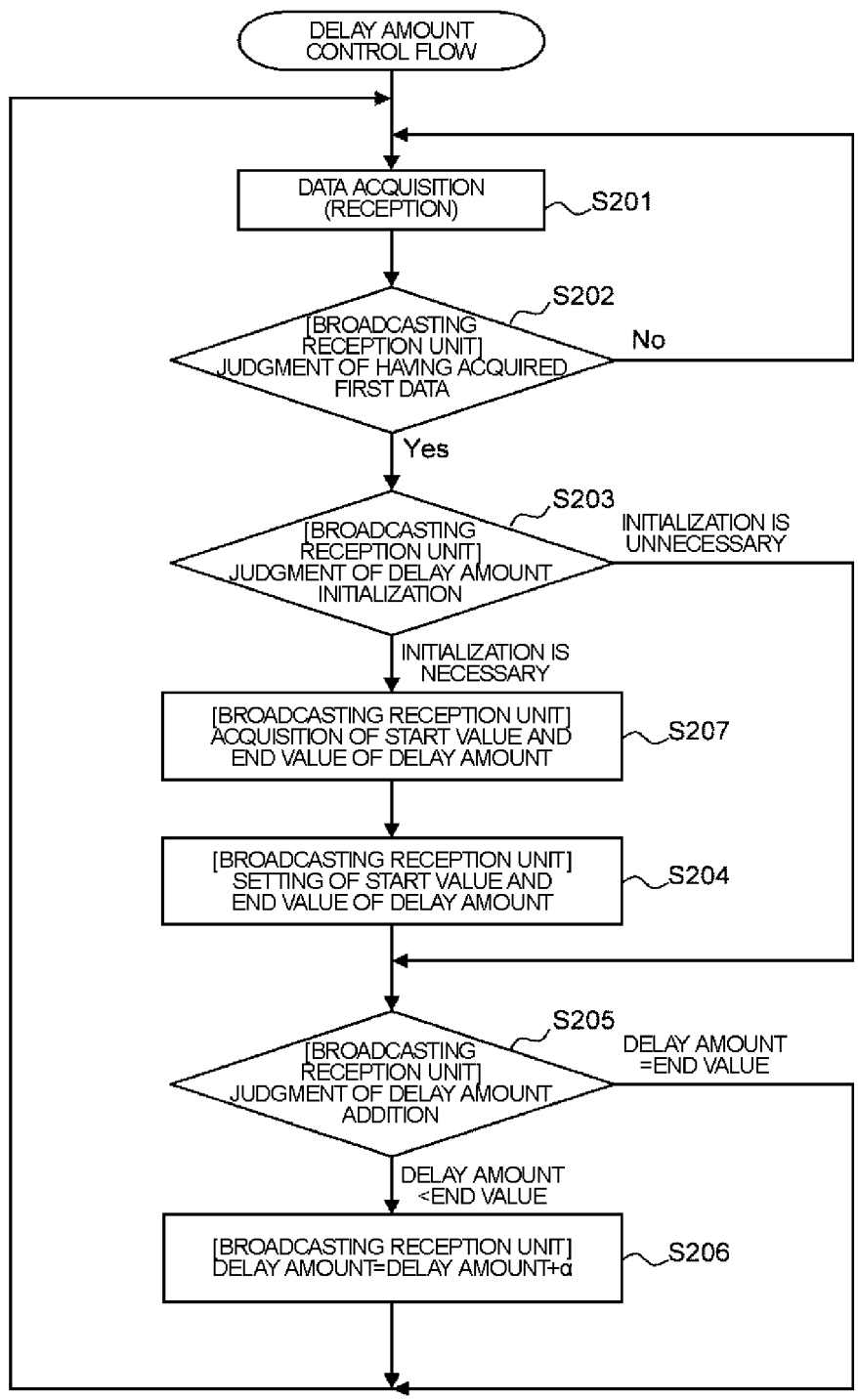
FIG. 11 is a flowchart showing a configuration example of a delay control flow of the content output device according to the Second Embodiment.

FIG. 11 is a flowchart showing a configuration example of a delay control flow of the content output device according to the Second Embodiment. With respect to the delay amount control flow of the content output device according to the First Embodiment shown in FIG. 5, a step (S207) of acquiring the start value and the end value of the delay amount from the delay amount decision unit 401 is added before the step (S204) of setting the start value and the end value of the delay amount after the step of judgment of delay amount initialization (S203). The broadcasting reception unit 402 performs judgment of delay amount initialization (S203), and if initialization is needed, the broadcasting reception unit 402 acquires the start value and the end value of the delay amount from the delay amount decision unit 401 (S207). The broadcasting reception unit 402 sets the acquired start value and end value of the delay amount (S204), and also utilizes the acquired end value for judgment of delay amount addition (S205). Since other respective steps are similar to the steps having already explained citing FIG. 5, explanations thereof are omitted. In addition, the slow reproduction control flow explained citing FIG. 7 can also be applied to the present embodiment as it is. Since a slow reproduction control flow is similar to the one having already explained citing FIG. 7, an explanation thereof is omitted.

In multimedia processing, threads may be used without deciding priority thereof in some cases. At that time, since start of each thread may be delayed, it is difficult to decide a moderate buffer accumulation amount. In the Second Embodiment, the start value of the delay amount prescribed by the output start delay time, and the end value of the delay amount that prescribes an eventual buffer accumulation amount are acquired from the delay amount decision unit 402, respectively. Most suitable start output delay time and buffer accumulation amount are decided, and thus there is an effect of enhancing tolerance to thread delay without deteriorating user visibility.

Hereinbefore, although the invention made by the present inventor has been specifically explained based on the embodiments, the present invention is not limited thereto, and it is needless to say that various modifications are possible within the scope not departing from the gist of the invention.

For example, each functional block prescribed in the explanations of the embodiments may be integrated, or may be distributed into a plurality of functional blocks. In addition, the functional blocks may be implemented by software or by hardware. When they are achieved by software, a platform in which the software is executed may be changed to a platform of architecture other than the data processing device 200 exemplified in FIG. 3. For example, the data processing device 200 may be changed to a data processing device provided with a different architecture incorporating a plurality of processors, incorporating a memory including a cache memory, further having a hierarchical bus structure, and the like.

What is claimed is:

1. A content output device, which:
    extracts video data, audio data, time stamps attached to the video data and the audio data, and common time information, from an input content,
    manages local common time information that changes with lapse of time based on the extracted common time information,
    includes a buffer that temporarily accumulates the extracted video data and audio data based on a delay amount, respectively,
    outputs video data in which a time obtained by adding the delay amount to the attached time stamp coincides with or has passed the local common time information, among the video data of the content accumulated in the buffer,
    outputs audio data in which a time obtained by adding the delay amount to the attached time stamp coincides with or has passed the local common time information, among the audio data of the content accumulated in the buffer, and
    sets the delay amount to be a predetermined start value when a new content is input to the buffer, then gradually increases the delay amount with lapse of time, and stops the increase of the delay amount when the delay amount reaches a predetermined end value,
    wherein the content output device comprises:
        a broadcasting reception unit that can receive a broadcast content;
        a stream analysis unit;
        a video control unit;
        a video reproduction unit;
        a display output unit;
        an audio control unit;
        an audio reproduction unit; and
        an audio output unit,
    wherein the buffer is constituted of a video buffer that is included in the video control unit and accumulates video data, and an audio buffer that is included in the audio control unit and accumulates audio data,
    wherein the broadcasting reception unit counts up, with lapse of time, common time information periodically extracted from an input content, and manages the local common time information by intermittent calibration according to the common time information,
    wherein the video control unit outputs, to the display output unit via the video reproduction unit, the video data in which the time obtained by adding the delay amount to the attached time stamp coincides with or has passed the local common time information, among the video data of the content accumulated in the video buffer,
    wherein the audio control unit outputs, to the audio output unit via the audio reproduction unit, the audio data in which the time obtained by adding the delay amount to the attached time stamp coincides with or has passed the local common time information, among the audio data of the content accumulated in the audio buffer, and
    wherein the broadcasting reception unit sets the delay amount to be the start value when a new content is input to the buffer, then gradually increases the delay amount with lapse of time, and stops the increase of the delay amount when the delay amount reaches the end value.

2. The content output device according to claim 1, wherein the content output device is constituted including a processor and a memory, and
    wherein the video control unit and the audio control unit are constituted by software that operates on the processor, and the video buffer and the audio buffer are allocated on the memory.

3. The content output device according to claim 2, wherein the content output device has other software that uses the processor and the memory, and further comprises a delay amount decision unit that adjusts one or both of the start value and the end value based on a system load for executing the other software.

4. The content output device according to claim 2, wherein at least a part of hardware including the processor is formed over a single semiconductor substrate.

5. The content output device according to claim 1, wherein, during a period in which the delay amount is increasing, slow reproduction rates are used for both the audio data and the video data, wherein the rates are based upon the delay amount.

6. A non-transitory storage medium having tangibly embodied thereon a program for reproducing and outputting video and audio from a content input to an input circuit by being executed using a processor, in a data processing device comprising:
   the input circuit to which the content is input;
   the processor;
   a memory;
   a broadcasting reception unit that can receive a broadcast content;
   a stream analysis unit;
   a video control unit;
   a video reproduction unit;
   a display output unit;
   an audio control unit;
   an audio reproduction unit; and
   an audio output unit,
   wherein the program comprises instructions to cause the data processing device to:
      extract video data, audio data, time stamps attached to the video data and the audio data, and common time information from the content input to the input circuit,
      manage local common time information that changes with lapse of time based on the extracted common time information,
      provide a buffer that is allocated on the memory and that temporarily accumulates the extracted video data and audio data based on a delay amount, respectively,
      output video data in which a time obtained by adding the delay amount to the attached time stamp coincides with or has passed the local common time information, among the video data of the content accumulated in the buffer,
      output audio data in which a time obtained by adding the delay amount to the attached time stamp coincides with or has passed the local common time information, among the audio data of the content accumulated in the buffer, and
      set the delay amount to be a predetermined start value when a new content is input to the buffer, then gradually increase the delay amount with lapse of time, and stop the increase of the delay amount when the delay amount reaches a predetermined end value,
   wherein the buffer is constituted of a video buffer that is included in the video control unit and accumulates video data, and an audio buffer that is included in the audio control unit and accumulates audio data,
   wherein the broadcasting reception unit counts up, with lapse of time, common time information periodically extracted from an input content, and manages the local common time information by intermittent calibration according to the common time information,
   wherein the video control unit outputs, to the display output unit via the video reproduction unit, the video data in which the time obtained by adding the delay amount to the attached time stamp coincides with or has passed the local common time information, among the video data of the content accumulated in the video buffer,
   wherein the audio control unit outputs, to the audio output unit via the audio reproduction unit, the audio data in which the time obtained by adding the delay amount to the attached time stamp coincides with or has passed the local common time information, among the audio data of the content accumulated in the audio buffer, and
   wherein the broadcasting reception unit sets the delay amount to be the start value when a new content is input to the buffer, then gradually increases the delay amount with lapse of time, and stops the increase of the delay amount when the delay amount reaches the end value.

7. The non-transitory storage medium according to claim 6, wherein the data processing device can execute an other program that uses the processor and the memory, and
   wherein the program further includes a delay amount decision unit that adjusts one or both of the start value and the end value based on a system load for executing the other program.

8. The non-transitory storage medium according to claim 6, wherein the program is divided into a plurality of threads and then executed.

9. The non-transitory storage medium according to claim 6, wherein, during a period in which the delay amount is increasing, slow reproduction rates are used for both the audio data and the video data, wherein the rates are based upon the delay amount.

10. A method for reproducing and outputting video and audio from a content input to an input circuit by being executed using a processor in a data processing device comprising the input circuit to which the content is input, the processor, and a memory, said method comprising:
   extracting video data, audio data, time stamps attached to the video data and the audio data, and common time information from the content input to the input circuit,
   managing local common time information that changes with lapse of time based on the extracted common time information,
   including a buffer that is allocated on the memory and that temporarily accumulates the extracted video data and audio data based on a delay amount, respectively,
   outputting video data in which a time obtained by adding the delay amount to the attached time stamp coincides with or has passed the local common time information, among the video data of the content accumulated in the buffer,
   outputting audio data in which a time obtained by adding the delay amount to the attached time stamp coincides with or has passed the local common time information, among the audio data of the content accumulated in the buffer, and
   setting the delay amount to be a predetermined start value when a new content is input to the buffer, then gradually increasing the delay amount with lapse of time, and stopping the increase of the delay amount when the delay amount reaches a predetermined end value,
   wherein the data processing device further includes a display output unit and an audio output unit, said method further comprising:
      a local common time information management flow that counts up, with lapse of time, the common time information periodically extracted from an input content, and manages the local common time information by intermittent calibration according to the common time information,
      a video reproduction control flow that outputs, to the display output unit, the video data in which the time obtained by adding the delay amount to the attached time stamp coincides with or has passed the local common time information, among the video data of the content accumulated in the buffer, an audio reproduction control flow that outputs, to the audio output unit, the audio data in which the time obtained by adding the delay amount to the attached time stamp coincides with or has passed the local common time information, among the audio data of the content accumulated in the buffer, and a delay amount control flow that sets the delay amount to be the start value when the new content is input to the buffer, then gradually increases the delay amount with lapse of time, and stops the increase of the delay amount when the delay amount reaches the end value.

11. The method according to claim 10, wherein the data processing device can execute another program that uses the processor and the memory, said method further comprising executing a delay amount decision unit that adjusts one or both of the start value and the end value based on a system load for executing the other program.

12. The method according to claim 10, as initially divided into a plurality of threads and then executed.

13. The method according to claim 10, wherein said data processing device can execute a plurality of threads, and wherein the program further includes a delay amount decision unit that adjusts one or both of the start value and the end value based on a system load for executing the plurality of threads.

14. The method according to claim 10, wherein the outputting of both video data and audio data in which a time obtained by adding the delay amount to the attached time stamp coincides with or has passed the local common time information provides a synchronization between the video data and audio data.

15. The method according to claim 10, wherein, during a period in which the delay amount is increasing, slow reproduction rates are used for both the audio data and the video data and the outputting of audio data and video data in accordance with the passing of local common time provides a synchronization between the audio data and the video data during this period in which the delay amount is increasing.

16. The method according to claim 15, wherein, during a period in which the delay amount is increasing, slow reproduction rates are used for both the audio data, the rate based upon the delay amount.

17. The method according to claim 10, wherein, during a period in which the delay amount is increasing, slow reproduction rates are used for both the audio data and the video data, wherein the rates are based upon the delay amount.

* * * * *